United States Patent
Nasr et al.

(10) Patent No.: US 12,164,019 B2
(45) Date of Patent: Dec. 10, 2024

(54) POINTING DEVICE FOR DETECTING MOTION RELATIVE TO A SURFACE AND METHOD FOR DETECTING MOTION OF A POINTING DEVICE RELATIVE TO A SURFACE

(71) Applicant: Infineon Technologies AG, Neubiberg (DE)

(72) Inventors: Ismail Nasr, Unterhaching (DE); Mohamed Hamouda, Munich (DE)

(73) Assignee: Infineon Technologies AG, Neubiberg (DE)

( * ) Notice: Subject to any disclaimer, the term of this patent is extended or adjusted under 35 U.S.C. 154(b) by 400 days.

(21) Appl. No.: 17/591,251

(22) Filed: Feb. 2, 2022

(65) Prior Publication Data

US 2022/0252713 A1    Aug. 11, 2022

(30) Foreign Application Priority Data

Feb. 8, 2021   (EP) .................................... 21155848

(51) Int. Cl.
| | |
|---|---|
| G01S 13/58 | (2006.01) |
| G01S 13/62 | (2006.01) |
| G01S 17/58 | (2006.01) |
| G06F 3/0354 | (2013.01) |
| H01Q 13/02 | (2006.01) |

(52) U.S. Cl.
CPC ............ *G01S 13/583* (2013.01); *G01S 13/62* (2013.01); *G01S 17/58* (2013.01); *G06F 3/03543* (2013.01); *H01Q 13/02* (2013.01)

(58) Field of Classification Search
CPC ........ G01S 13/583; G01S 13/62; G01S 17/58; G06F 3/0354; G06F 3/03543; H01Q 13/02
See application file for complete search history.

(56) References Cited

U.S. PATENT DOCUMENTS

| | | | | |
|---|---|---|---|---|
| 5,382,785 | A | * | 1/1995 | Rink .................... H03K 17/941 250/559.4 |
| 5,793,357 | A | * | 8/1998 | Ivey ........................ G01S 17/50 250/221 |
| 6,057,540 | A | * | 5/2000 | Gordon ................. G06F 3/0213 250/221 |
| 6,246,482 | B1 | * | 6/2001 | Kinrot .................. G01B 9/0207 356/505 |
| 6,424,407 | B1 | * | 7/2002 | Kinrot .................. G01S 7/4811 356/28 |
| 6,707,027 | B2 | * | 3/2004 | Liess ....................... G01P 3/366 345/157 |
| 6,741,335 | B2 | * | 5/2004 | Kinrot ..................... G01P 3/366 356/28 |

(Continued)

FOREIGN PATENT DOCUMENTS

KR            100432529 B1      5/2004

*Primary Examiner* — Peter M Bythrow
(74) *Attorney, Agent, or Firm* — Slater Matsil, LLP

(57) ABSTRACT

A pointing device for detecting motion relative to a surface includes a transmitter configured to emit an electromagnetic signal toward the surface. The pointing device further includes a receiver configured to receive a reflection of the electromagnetic signal from the surface. The pointing device further includes a processor configured to determine the motion based on a Doppler-shift between the electromagnetic signal and its reflection.

20 Claims, 3 Drawing Sheets

(56) References Cited

U.S. PATENT DOCUMENTS

| | | | | |
|---|---|---|---|---|
| 7,126,586 | B2* | 10/2006 | Jianping | G01P 3/366 250/221 |
| 7,189,985 | B2* | 3/2007 | Xie | G06F 3/0317 250/559.38 |
| 7,324,086 | B2* | 1/2008 | Kong | G06F 3/03543 345/157 |
| 7,339,683 | B2* | 3/2008 | Weijers | G06F 3/0421 356/519 |
| 7,557,795 | B2* | 7/2009 | Kong | G06F 3/03543 345/166 |
| 7,872,639 | B2* | 1/2011 | Theytaz | G06F 3/03543 345/166 |
| 7,889,353 | B2* | 2/2011 | Schemmann | G06F 3/0421 356/498 |
| 7,973,768 | B2* | 7/2011 | Ang | G06F 3/0317 345/158 |
| 7,994,468 | B2* | 8/2011 | Duijve | G01S 17/87 250/221 |
| 9,013,709 | B2* | 4/2015 | Schemmann | G06F 3/0317 356/498 |
| 9,103,658 | B2* | 8/2015 | Mu | G01B 11/22 |
| 9,201,559 | B2* | 12/2015 | Piot | G06F 3/03541 |
| 11,422,669 | B1* | 8/2022 | Ravasz | G06F 3/013 |
| 2003/0103037 | A1* | 6/2003 | Rotzoll | G06F 3/0317 345/157 |
| 2005/0134556 | A1* | 6/2005 | VanWiggeren | G06F 3/0317 345/156 |
| 2005/0156874 | A1* | 7/2005 | Kong | G06F 3/0421 345/156 |
| 2005/0156875 | A1* | 7/2005 | Kong | G06F 3/03543 345/156 |
| 2005/0231482 | A1* | 10/2005 | Theytaz | G06F 3/0317 345/166 |
| 2006/0012562 | A1* | 1/2006 | Pope | G06F 3/03543 345/156 |
| 2006/0055674 | A1* | 3/2006 | Joung | G06F 3/038 345/166 |
| 2006/0072102 | A1* | 4/2006 | Jianping | G06F 3/03544 356/28.5 |
| 2007/0008286 | A1* | 1/2007 | Theytaz | G06F 3/0317 345/166 |
| 2007/0013661 | A1* | 1/2007 | Theytaz | G06F 3/03543 345/166 |
| 2007/0164999 | A1* | 7/2007 | Gruhlke | G06F 3/0317 345/166 |
| 2008/0225300 | A1* | 9/2008 | Schemmann | G06F 3/0421 356/450 |
| 2012/0200861 | A1* | 8/2012 | Chen | G01B 11/002 356/614 |
| 2018/0088686 | A1* | 3/2018 | Zuber | G06F 3/0383 |
| 2019/0155411 | A1* | 5/2019 | Kinrot | G06F 3/0383 |
| 2020/0150771 | A1* | 5/2020 | Giusti | G01S 13/06 |
| 2020/0191938 | A1* | 6/2020 | Green | B61L 25/021 |
| 2020/0201453 | A1* | 6/2020 | Lee | G06F 3/03543 |
| 2021/0141092 | A1* | 5/2021 | Chen | G01S 13/867 |
| 2021/0173055 | A1* | 6/2021 | Jian | G01S 7/4808 |
| 2021/0215808 | A1* | 7/2021 | Abari | G01S 7/403 |
| 2022/0061815 | A1* | 3/2022 | Flaherty | A61B 8/5207 |

\* cited by examiner

POINTING DEVICE FOR DETECTING MOTION RELATIVE TO A SURFACE AND METHOD FOR DETECTING MOTION OF A POINTING DEVICE RELATIVE TO A SURFACE

This application claims the benefit of European Patent Application No. 21155848, filed on Feb. 8, 2021, which application is hereby incorporated herein by reference.

TECHNICAL FIELD

The present disclosure relates to pointing devices for detecting motion relative to a surface and methods for detecting motion of a pointing device relative to a surface.

BACKGROUND

A pointing device is an input interface that may be coupled with a computing device, for example, a computer and allows a user to input spatial data to the computer. Graphical user interfaces (GUIs) allow the user to control and provide data to the computer using physical gestures by moving the pointing device across the surface of the physical desktop and activating switches on the mouse. A GUI is a form of user interface that allows users to interact with electronic devices for example through graphical icons. Movements of the pointing device are echoed on the screen by movements of the pointer or cursor and other visual changes. While the most common pointing device is a hand-held computer mouse, many more devices have been developed. However, the term mouse is commonly used for devices that move the cursor. The computer mouse is a hand-held pointing device that detects two-dimensional motion relative to a surface. This motion is typically translated into the motion of a pointer on a display, which allows a smooth control of the GUI of a computer.

Current mainstream solutions of pointing devices utilize laser-based cameras to detect motion by comparing the captured images. This process suffers when the surface does not contain differentiating details, for example, high-quality single-color surfaces, metal, or glass surfaces, within the resolution limits of the camera to allow for detecting motion. Moreover, glass and glass like surfaces are highly transparent to optical cameras, which poses limitation on the quality of the captured images. This makes the comparison process to detect the motion impossible. This limitation usually leads to the need for a special surface, for example a mouse pad, placed below the pointing device, to allow for easier motion detection. The use of such mouse pad is a limitation especially when there is more and more demand for mobility and flexibility when operating the pointing device.

SUMMARY

Therefore, there is a need to provide a pointing device and a method for detecting motion of a pointing device relative to a surface which can be operated on a broad range of surfaces and allows an easier and reliable motion detection.

According to a first aspect, the present disclosure proposes a pointing device for detecting motion relative to a surface. The pointing device comprises at least one transmitter which is configured to emit an electromagnetic signal toward the surface. The pointing device further comprises at least one receiver which is configured to receive a reflection of the electromagnetic signal from the surface. The pointing device also comprises a processor which is configured to determine the motion based on a Doppler-shift between the electromagnetic signal and its reflection.

The term "reflection" of the electromagnetic signal from the surface from the surface also comprises diffuse reflections, such as backscattered electromagnetic signals.

The present disclosure thus proposes the use of the Doppler-principle in a pointing device application. The transmitter sends the electromagnetic signal towards the surface and the reflection of the electromagnetic signal is shifted in frequency by the Doppler-shift, which is proportional to a velocity of the surface relative to the pointing device. The reflection of the electromagnetic signal from the surface is then captured by the receiver to determine the Doppler-shift. The motion of the pointing device relative to the surface is determined based on the Doppler-shift between the electromagnetic signal and its reflection. Thus, no images are taken to determine the motion of the pointing device relative to the surface which enables the pointing device to work directly on a broad range of surfaces such as reflective or monotonic surfaces without the use of the mouse pad. It allows the pointing device to work virtually on any surface. Moreover, the principle of this disclosure does not require the use of complex two dimensional, 2D, image processing techniques which there-fore reduces the complexity of the system and hence the costs.

In some embodiments, the electromagnetic signal may be a radar signal. The radar signal may have a frequency between 30 MHz and 300 GHz. In particular, the radar signal may have a frequency between 76 and 77 GHz.

In alternative embodiments, the electromagnetic signal may be a laser signal, including infrared laser to ultraviolet laser signals.

In some embodiments, the transmitter is configured to emit the electromagnetic signal in an acute angle toward the surface. This may enable a proper reflection of the electromagnetic signal at the surface.

In some embodiments, the transmitter may be configured to modulate a frequency of the electromagnetic signal in accordance with one of Frequency Modulated Continuous Wave (FMCW) modulation, or Frequency Shift Keying (FSK). This can make the system more robust in that additional modulation allows to provide distance information along with the Doppler frequency. This distance information can be used to filter (e.g., not consider for purposes of motion detection) any possible unwanted signals that originate from surfaces other than the direct surface upon the pointing device is moving. This may use the fact that the distance to the wanted surface is known by the mechanical construction of the pointing device.

In some embodiments, the transmitter further comprises a horn antenna and/or a wave-guide structure configured to focus the electromagnetic signal on the surface. Focusing the electromagnetic signal to a possibly small surface area may further improve the motion detection since unwanted scattered signal components can be avoided.

In some embodiments, the transmitter and the receiver are integrated into an integrated transceiver circuit. This may allow the use of existing transceiver chips, for example, from the field of automotive radars or lidars. Further, commonly integrating transmitter and receiver in a common integrated circuit (IC) may enable the use of a common local oscillator (LO) circuit.

In some embodiments using a laser signal as electromagnetic signal, the receiver may comprise a photodetector, such as a Charge Coupled Device (CCD) sensor, for example.

In some embodiments, the pointing device may be configured to 2D motion sensing and thus comprise a first transmitter configured to emit a first electromagnetic signal toward the surface in a first direction (for example, x-direction), and a first receiver configured to receive a reflection of the first electromagnetic signal from the surface. The pointing device may further comprise a second transmitter configured to emit a second electromagnetic signal toward the surface in a second direction (for example, y-direction) perpendicular to the first direction, and a second receiver configured to receive a reflection of the second electromagnetic signal from the surface. The pointing device may also comprise a processor configured to determine the motion in a first motion direction (for example, x-direction) based on the Doppler-shift between the first electromagnetic signal and its re-flection and in a second motion direction (for example, y-direction) based on the Doppler-shift between the second electromagnetic signal and its reflection.

In some embodiments, the pointing device may be configured as a computer mouse. Computer mouses usually rely on 2D motion detection.

According to a further aspect, the present disclosure also proposes a method for detecting motion of a handheld pointing device relative to a surface. The method includes emitting at least one electromagnetic signal toward the surface, receiving a reflection of the electromagnetic signal from the surface, and determining the motion based on a Doppler-shift between the electromagnetic signal and its reflection.

For 2D motion detection, the method may include emitting a first electromagnetic signal toward the surface in a first direction, receiving a reflection of the first electromagnetic signal from the surface, emitting a second electromagnetic signal toward the surface in a second direction perpendicular to the first direction, receiving a reflection of the second electromagnetic signal from the surface, and determining the motion in a first motion direction based on the Doppler-shift between the first electromagnetic signal and its reflection and in a second motion direction based on the Doppler-shift between the second electromagnetic signal and its reflection.

BRIEF DESCRIPTION OF THE DRAWINGS

Some examples of apparatuses and/or methods will be described in the following by way of example only, and with reference to the accompanying figures, in which.

DETAILED DESCRIPTION OF ILLUSTRATIVE EMBODIMENTS

Figure 1A:
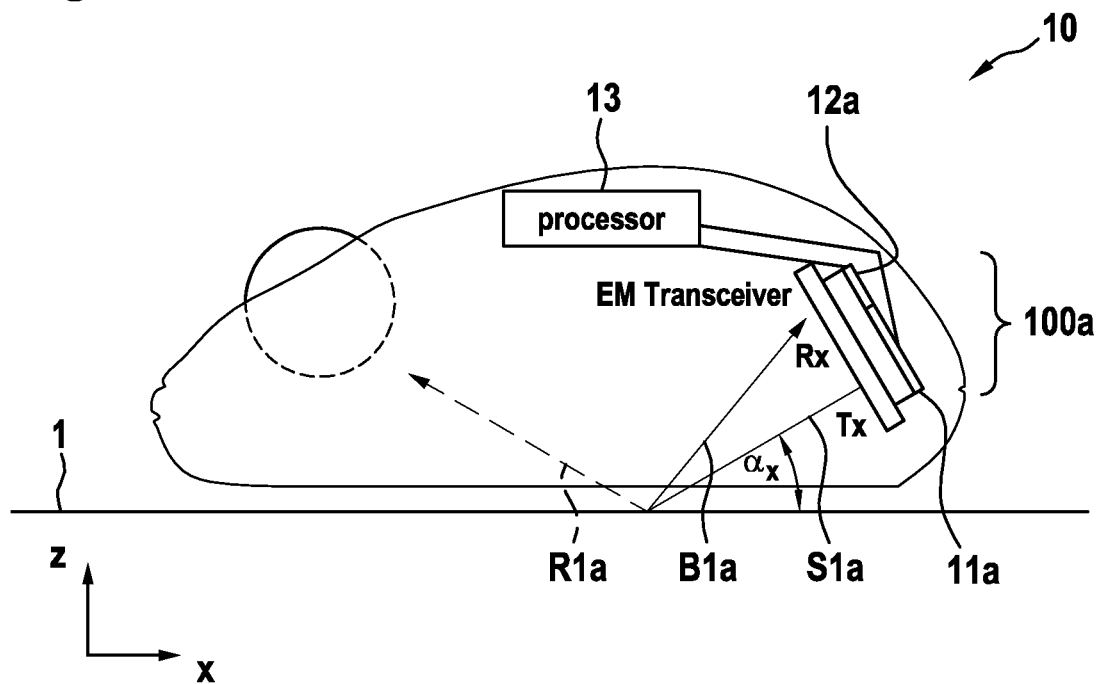
FIG. 1a shows a longitudinal section of a pointing device for detecting motion relative to a surface according to a first example of the present disclosure.

Some examples are now described in more detail with reference to the enclosed figures. However, other possible examples are not limited to the features of these embodiments described in detail. Other examples may include modifications of the features as well as equivalents and alternatives to the features. Furthermore, the terminology used herein to describe certain examples should not be restrictive of further possible examples.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or,' this is to be understood as disclosing all possible combinations, i.e. only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a," "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include," "including," "comprise" and/or "comprising," when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1a shows a longitudinal section of a pointing device 10 for detecting motion relative to a surface 1 according to a first example of the present disclosure.

The pointing device 10 comprises a transmitter 11a to emit an electromagnetic signal S1a toward the surface 1. The pointing device 10 further comprises a receiver 12a to receive a reflection R1a of the electromagnetic signal S1a from the surface 1. The pointing device 10 further comprises a processor 13 to determine the motion based on a Doppler shift between the electromagnetic signal S1a and its reflection R1a. In some embodiments, transmitter 11a and receiver 12a may be implemented in a common transceiver IC. In some embodiments, processor 13 may also be integrated into the common transceiver IC.

In the illustrated example, the pointing device 10 is configured as a computer mouse. Thus, the surface 1 may be the surface of a desk, for example. The skilled person having benefit from the present disclosure will appreciate, however, that the principles of the present disclosure are not limited to computer mice but are applicable to any pointing device that uses one or more-dimensional motion relative to a surface.

The transmitter 11a is configured to emit the electromagnetic signal S1a toward the surface in an acute angle of incidence $\alpha_x$. For that purpose, transmitter 11a may be equipped with one or more directional transmit antennas and/or other means for directing electromagnetic waves in a predetermined direction (for example, one or more lenses). The angle of incidence $\alpha_x$ may be between 20° and 70°, for example, depending on the geometry and dimensions of the pointing device 10. In the illustrated example, the emitted electromagnetic signal S1a has components in x- and z-direction. In accordance with the law of reflection (angle of reflection=angle of incidence), the electromagnetic signal S1a may be reflected at a point of incidence of the surface 1. Additionally, due to surface roughness, diffusely reflected or backscattered signals B1a with weaker strengths may be reflected also in other directions, in particular also back to receiver 12a. The resulting backscattered signal B1a then propagates from the point of incidence toward the receiver 12a. The receiver 12a may be equipped with one or more receive antennas and/or other means detecting electromagnetic waves (for example, one or more photodetectors). In the illustrated example, the receiver 12a is substantially collocated with the transmitter 11a. That is, transmitter 11a and receiver 12a are located to have substantially the same relative speed vis-à-vis the point of incidence. This means that both transmitter 11a and receiver 12a should either move towards the point of incidence or move away from the point of incidence.

The electromagnetic signal S1a may be emitted with a carrier frequency. Depending on the carrier frequency, the electromagnetic signal S1a may be a radio signal or a light signal. The skilled person having benefit from the present disclosure will appreciate that the principles of the present disclosure are applicable to either frequency range. If the pointing device 10 is moved relative to the surface 1 (or the point of incidence) in x-direction with speed $\Delta v_x$, for example, the x-component of electromagnetic signal S1a will experience a Doppler shift $\Delta f_x$ of $$\Delta f_x = \frac{\Delta v_x}{c} f_0 \cos(\alpha_x)$$

where $f_0$ is the carrier frequency of electromagnetic signal S1a and c is the speed of light. This Doppler shift $\Delta f_x$ and hence the relative motion in x-direction with speed $\Delta v_x$ between pointing device 10 and surface 1 can be detected by the processor 13 by comparing the frequencies of the emitted electromagnetic signal S1a and the backscattered signal B1a received at receiver 12a. For example, this may be done by mixing the received backscattered signal B1a with the transmitted electromagnetic signal S1a. If transmitter 11a and receiver 12a are substantially collocated (for example, in a common transceiver IC), the Doppler shift of the backscattered signal B1a at the receiver may substantially be $2\Delta f_x$. The skilled person having benefit from the present disclosure will appreciate that collocation of transmitter 11a and receiver 12a may merely serve for explanatory purposes. Also, other predefined relative positions/geometries of transmitter 11a and receiver 12a are conceivable as long they do not lead to relative speeds vis-à-vis the point of incidence having the same magnitude but different signs.

The example illustrated in FIG. 1a can be used for detecting motion of the pointing device 10 in x-direction. This 1D motion detection may be sufficient in some embodiments. However, if motion detection in a second dimension, for example, y-direction, is desired, the pointing device 10 may comprise an additional transmitter-receiver pair.

Figure 1B:
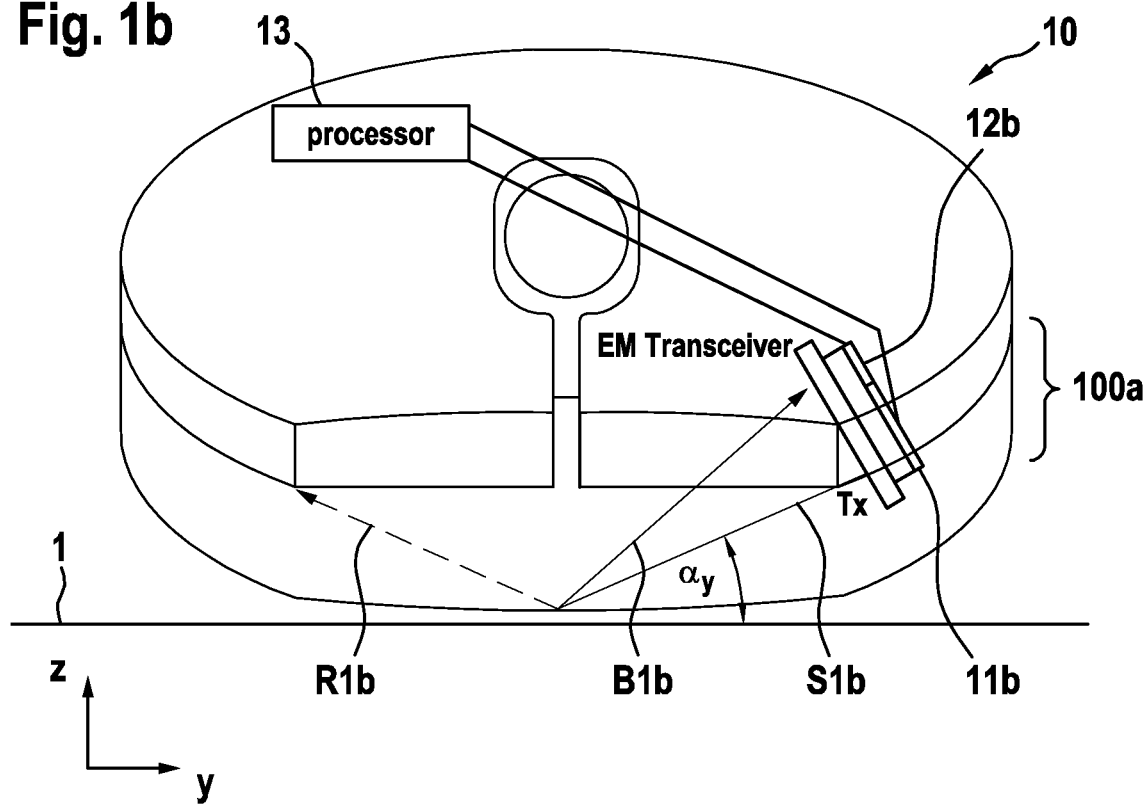
FIG. 1b shows a cross section of the pointing device for detecting motion relative to the surface according to the first example of the present disclosure.

FIG. 1b shows a cross section of pointing device 10 along y-direction.

Here, pointing device 10 comprises a second transmitter 11b and a second receiver 12b (e.g., in addition to the first transmitter 11a and the first receiver 12a). Again, transmitter 11b and receiver 12b may be substantially collocated. The transmitter 11b is configured to emit a second electromagnetic signal S1b toward the surface 1 in an acute angle $\alpha_y$. The angle $\alpha_y$ may be between 20° and 70°, for example, depending on the geometry of the pointing device 10. In some embodiments, $\alpha_y$ may be equal to $\alpha_x$. In the illustrated example, the emitted electromagnetic signal S1b has components in y- and z-direction. Thus, in some embodiments, the emission direction of electromagnetic signal S1b is perpendicular to the emission direction of electromagnetic signal S1a. In accordance with the law of reflection (angle of reflection=angle of incidence), the electromagnetic signal S1b is reflected at a point of incidence of the surface 1. Additionally, due to surface roughness, backscattered signals B1b may be reflected also in other directions, in particular also back to receiver 12b. The resulting backscattered signal B1b then propagates toward the receiver 12b.

If the pointing device 10 is moved relative to the surface in y-direction with speed $\Delta v_y$, for example, the y-component of electromagnetic signal S1b will experience a Doppler shift $\Delta f_y$ of $$\Delta f_y = \frac{\Delta v_y}{c} f_0 \cos(\alpha_y)$$

This Doppler shift $\Delta f_y$ and hence the relative motion in y-direction with speed $\Delta v_y$ between pointing device 10 and surface 1 can be detected at the processor 13 by comparing the frequencies of the emitted electromagnetic signal S1b and backscattered signal B1b received by receiver 12b. For example, this may be done by mixing the received backscattered signal B1b with the electromagnetic signal S1b. If transmitter 11b and receiver 12b are substantially collocated, the Doppler shift of the backscattered signal B1b at the receiver vis-à-vis the emitted electromagnetic signal S1b may essentially be $2\Delta f_y$.

While the electromagnetic signals S1a and S1b for the x- and y-components may generally have different carrier frequencies, practical implementations may prefer equal carrier frequencies. In particular, both electromagnetic signals S1a and S1b may be generated using a common local oscillator (LO) circuit. In this way, transmitters 11a, 11b and receivers 12a, 12b may all share a common LO circuit which may lead to an efficient hardware implementation.

In some embodiments, the transmitter(s) may be configured to modulate the carrier wave(s) of the electromagnetic signal(s). Examples of modulation techniques are Frequency-modulated continuous-wave (FMCW), Frequency-shift keying (FSK), Phase-shift keying, Amplitude-shift keying (ASK), etc. Such modulation techniques may enable determining distance in addition to speed. This may increase reliability by providing distance measurement along with speed measurement, which may be desirable when there is more than one source of reflection/backscattering arriving at the receiver. The distance information can be extracted by demodulation of the received electromagnetic signal. In this case the Doppler signals can be entangled with the distance information of the surface 1 they were reflected from. This distance information can be used to filter any possible unwanted signals that may originate from surfaces other than the direct surface upon the pointing device is moving. This uses the fact that the distance to the wanted surface is known by the mechanical construction of the pointing device. Unwanted signals can become a source in detection error especially with surfaces transparent to the electromagnetic wave, as strong reflections may happen for the next surface the waves hit (example floor surface below a table).

To further improve speed detection accuracy, the electromagnetic signal(s) may be guided to hit the smallest possible contact area on the surface 1. A wide contact area may result in the detection of Doppler speed components from the respective orthogonal direction of motion. Thus, the transmitter(s) may optionally further comprise respective waveguide structures (not shown) configured to focus the electromagnetic signal on the surface 1. The waveguide structure may be used to focus the electromagnetic signal as a beam and avoid a wide exposure of the beam on the surface 1. The waveguide structure may be attached to the transmitter. The waveguide structure may guide the electromagnetic signal transmitted from the transmitter toward the surface 1 to hit a smallest possible surface area on the surface 1. The waveguide structure is a physical structure that guides the electromagnetic signal with minimal loss of energy by restricting the transmission of energy in at least one direction. To improve radiation efficiency and directivity of the electromagnetic signal, the waveguide structure may be provided with an extended aperture to make the abrupt discontinuity of the wave into a gradual transformation. The waveguide structure may have, for example, the extended aperture with a rectangular, a circular or an elliptical cross section. The waveguide structure may be fabricated with the use of three-dimensional (3D) printers or other fabrication techniques.

The transmitter(s) may further additionally or alternatively comprise respective horn antennas configured to focus the electromagnetic signal on the surface 1. A horn antenna may be used with or without the waveguide structure to focus the electromagnetic signal. A horn antenna may be used to focus the electromagnetic signal as a beam and avoid a wide exposure of the beam on the surface 1. The horn antenna may guide the electromagnetic signal transmitted from the transmitter toward the surface 1 to hit a smallest possible surface area on the surface 1. The horn antenna may be attached to an end of the waveguide structure, for example. Alternatively, the horn antenna may also be attached directly to a frontend circuit of the transmitter if only the horn antenna is used without the waveguide structure to focus the electromagnetic signal. A horn antenna is an antenna that may comprise a flaring waveguide structure shaped like a horn to direct the electromagnetic signal in a beam toward the surface 1. The horn antenna may be used to transmit the electromagnetic signal from the transmitter in a narrow beam to the surface 1. Horn antennas may have different flare angles as well as different expansion curves, for example elliptic or hyperbolic, allowing a wide variety of beam profiles. The horn antenna may be a pyramidal horn, e.g., in the shape of a four-sided pyramid, with a rectangular cross section. The horn antenna may be a sectoral horn, which is a pyramidal horn with only one pair of flared sides and another pair of parallel sides. The sectoral horn produces a fan-shaped beam, which is narrow in a plane of the flared sides compared to a plane of the parallel sides. The horn antenna 16a may be a conical horn, which is a horn in the shape of a cone with a circular cross section. The horn antenna may be an exponential horn, which is a horn with curved sides, in which the separation of the sides increases as an exponential function of length. The exponential horn may have pyramidal or conical cross sections. Exponential horns have minimum internal reflections. Exponential horns may be used in applications requiring high performance. The horn antenna may be a corrugated horn, which is a horn with parallel slots or grooves, small compared with a wavelength of the electromagnetic signal and covering the inside surface of the horn, transverse to a longitudinal axis of the horn. The horn antenna may be fabricated with the use of 3D printers or other plastic fabrication techniques.

Figure 2:
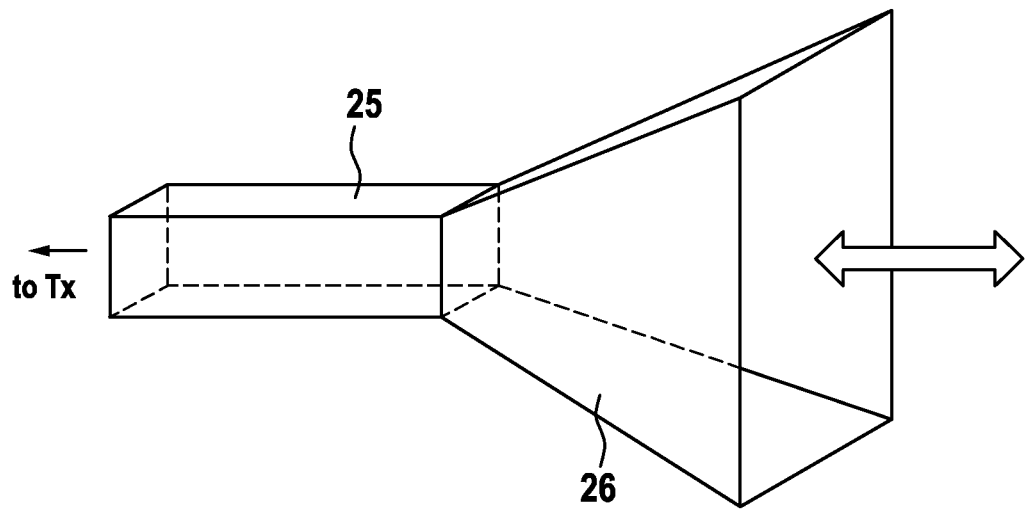
FIG. 2 shows schematic view of a waveguide combined with a horn antenna.

A schematic view of a waveguide 25 combined with a horn antenna 26 is shown in FIG. 2. The end of the waveguide 25 opposite to the horn antenna 26 can be coupled to a transmitter 11, 21. Thus, the waveguide 26 can convey radio waves from the transmitter 11, 21 to the horn antenna 26. The horn antenna 26 can then provide a gradual transition to match the impedance of the waveguide 26 to the impedance of free space. The skilled person having benefit from the present disclosure will appreciate that the horn antenna 26 may point to the surface 1 in an acute angle. The skilled person will further appreciate that a waveguide 25 combined with a horn antenna 26 may also be used to convey radio waves reflected from the surface 1 to the receiver 12 or the EM reflector 24. Thus, the end of the waveguide 25 opposite to the horn antenna 26 may also be coupled to a receiver 12 or EM reflector 24.

Figure 3:
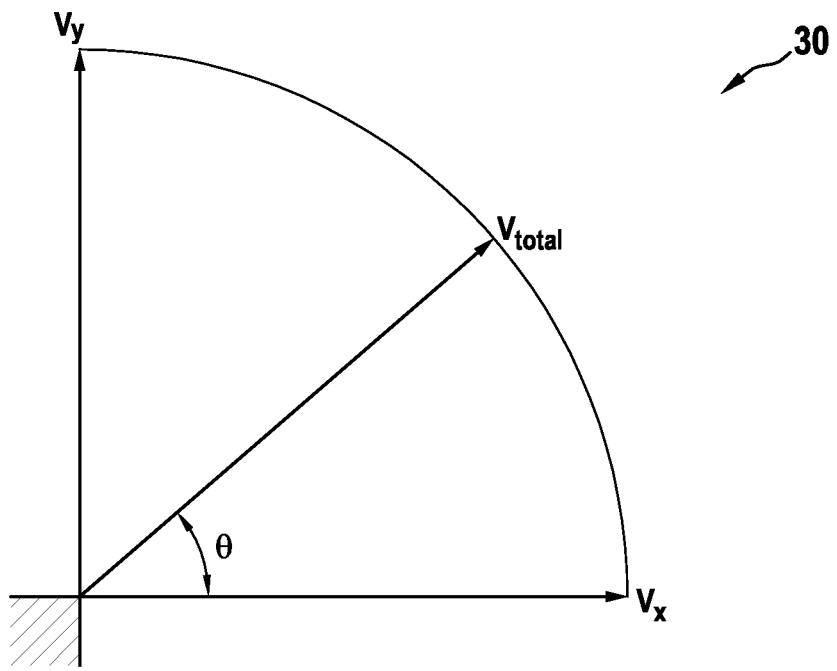
FIG. 3 shows a pointer diagram of a detected motion of the pointing device relative to the surface.

FIG. 3 shows a pointer diagram 30 of a detected 2D motion relative to the surface 1 comprising a first motion direction x and a second motion direction y.

As described in the foregoing, reflections of electromagnetic signals from the surface 1 are compared with the respective electromagnetic signals to obtain information about a motion and velocity of the pointing device 10, 20 relative to the surface 1 using the Doppler principle. Such information about the motion and velocity of the pointing device 10, 20 is shown in the pointer diagram 30 in FIG. 3. An abscissa of the pointer diagram 30 shown in FIG. 3 refers to velocity $v_x$ of the pointing device 10, 20 relative to the surface 1. An ordinate of the pointer diagram 30 shown in FIG. 3 refers to velocity $v_y$ of the pointing device 10, 20 relative to the surface 1. The determination of the total velocity and direction of movement of the pointing device 10, 20 relative the surface 1 may be for instance carried out using the following equations:

$$v_{total} = \sqrt{v_x^2 + v_y^2}$$
$$\theta = \sin^{-1}\frac{v_y}{v_{total}} = \arcsin\frac{v_y}{v_{total}}$$

with $v_{total}$ denoting a magnitude of the total velocity of the pointing device 10, 20 relative to the surface 1, $v_x$ denoting a magnitude of the velocity of the pointing device 10, 20 relative to the surface 1 in the first motion direction x detected by first receiver 12a, 22a, $v_y$ denoting a magnitude of the velocity of the pointing device 10, 20 relative to the surface 1 in the second motion direction y detected by second receiver 12b, 22b, and θ denoting the moving angle of pointing device 10, 20. θ is the angle between velocity component $v_x$ and the total velocity.

Figure 4:
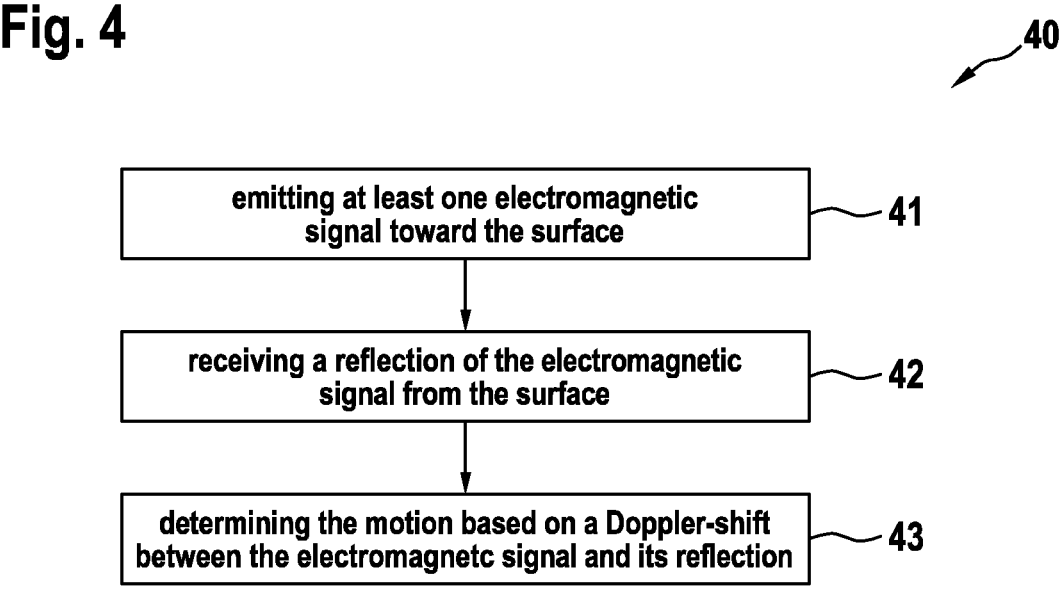
FIG. 4 shows a flow-chart of a method for detecting motion of a handheld pointing device relative to a surface according to a first example of the present disclosure.

FIG. 4 shows a flowchart of a method 40 for detecting motion of a pointing device 10, 20 relative to a surface 1 according to present disclosure.

Method 40 comprises emitting 41 at least one electromagnetic signal toward the surface 1. Emitting 41 the at least one electromagnetic signal may comprise emitting the electromagnetic signal in an acute angle toward the surface 1. Emitting 41 the at least one electromagnetic signal may further comprise modulating a frequency of the at least one electromagnetic signal in accordance with one of FMCW modulation, or FSK. Emitting 41 the at least one electromagnetic signal may further comprise focusing the electromagnetic signal on the surface using a horn antenna, a waveguide structure and/or a lens system comprising at least one lens.

Method 40 further comprises receiving 42 a reflection of the electromagnetic signal from the surface 1.

Method 40 further comprises determining 43 the motion based on a Doppler-shift between the electromagnetic signal and its reflection. The reflection of the electromagnetic signal from the surface 1 is shifted in frequency by an amount, which is linearly proportional to a velocity of the surface relative to the receiver. Due to this change in frequency of the reflection of the electromagnetic signal from the surface, it is possible to determine to the velocity of the receiver relative to the surface.

More details and aspects are mentioned in connection with the embodiments described above or below. The example shown in FIG. 4 may comprise one or more optional additional features.

Embodiments of the present disclosure propose to use the Doppler principle to detect relative ground/surface motion in one, two, or even three dimensions to control the pointing device. The Doppler signals can be generated using electromagnetic waves by two radar sensors (e.g., millimeter-wave radar sensors) pointed at the surface in orthogonal directions. The radar may send a radio frequency signal to the ground and the reflected signal is the shifted in frequency by an amount, which is linearly proportional to the speed of the ground relative to the radar sensor (Doppler principle). The reflected signal from the ground is then captured by the receiver side of the radar sensor to isolate the Doppler frequency from the carrier frequency.

Alternatively, the Doppler signal can also be generated with the help of laser, in which a laser beam is pointed to the ground and the reflected signal from the ground is received by a photodetector that isolates the Doppler frequency from the carrier to help determine the speed of the ground motion relative to the pointing device.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means," "means for providing a signal," "means for generating a signal," etc., may be implemented in the form of dedicated hardware, such as "a signal provider," "a signal processing unit," "a processor," "a controller," etc., as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A pointing device for detecting motion relative to a surface, the pointing device comprising
    a first radar transmitter configured to emit a first radar signal towards the surface;
    a first radar receiver configured to receive a reflection of the first radar signal from the surface; and a processor configured to determine the motion based on a Doppler-shift between the first radar signal and the reflection of the first radar signal.

2. The pointing device of claim 1, wherein the first radar transmitter is configured to emit the first radar signal in an acute angle with respect to the surface and towards the surface.

3. The pointing device of claim 1, wherein the first radar transmitter is configured to modulate a frequency of the first radar signal in accordance with one of Frequency Modulated Continuous Wave (FMCW) modulation, or Frequency Shift Keying (FSK).

4. The pointing device of claim 1, wherein the first radar transmitter further comprises a horn antenna or a waveguide structure configured to focus the first radar signal on the surface.

5. The pointing device of claim 4, wherein the first radar transmitter comprises the horn antenna and the waveguide structure.

6. The pointing device of claim 1, wherein the first radar transmitter and the first radar receiver are integrated into an integrated transceiver circuit.

7. The pointing device of claim 1, wherein the first radar receiver comprises a photodetector.

8. The pointing device of claim 1, wherein the first radar transmitter is configured to emit the first radar signal towards the surface in a first direction, and wherein the pointing device further comprises:
a second radar transmitter configured to emit a second radar signal towards the surface in a second direction perpendicular to the first direction; and
a second radar receiver configured to receive a reflection of the second radar signal from the surface, wherein the processor is configured to determine the motion in a first motion direction based on the Doppler-shift between the first radar signal and the reflection of the first radar signal, and in a second motion direction based on a Doppler-shift between the second radar signal and the reflection of the second radar signal, wherein the first motion direction is perpendicular to the second motion direction.

9. The pointing device of claim 1, wherein the reflection of the first radar signal from the surface is a backscattered signal.

10. The pointing device of claim 1, wherein the pointing device is configured as a computer mouse.

11. A method for detecting motion of a handheld pointing device relative to a surface, the method comprising:
emitting a first radar signal towards the surface;
receiving a reflection of the first radar signal from the surface; and
determining the motion of the handheld pointing device based on a Doppler-shift between the first radar signal and the reflection of the first radar signal.

12. The method of claim 11, wherein emitting the first radar signal towards the surface comprises emitting the first radar signal towards the surface in a first direction, the method further comprising:
emitting a second radar signal towards the surface in a second direction perpendicular to the first direction;
receiving a reflection of the second radar signal from the surface; and
determining the motion in a first motion direction based on the Doppler-shift between the first radar signal and the reflection of the first radar signal, and in a second motion direction based on a Doppler-shift between the second radar signal and the reflection of the second radar signal, wherein the second motion direction is different from the first motion direction.

13. The method of claim 11, wherein emitting the first radar signal comprises emitting the first radar signal in an acute angle with respect to the surface towards the surface.

14. The method of claim 11, further comprising modulating a frequency of the first radar signal in accordance with one of Frequency Modulated Continuous Wave (FMCW) modulation, or Frequency Shift Keying (FSK).

15. The method of claim 11, further comprising focusing the first radar signal on the surface using a horn antenna or a waveguide structure.

16. A pointing device comprising:
a first millimeter-wave radar sensor comprising a first transmitter configured to emit a first electromagnetic signal towards a surface in a first direction, and a first receiver configured to receive a reflection of the first electromagnetic signal from the surface;
a second millimeter-wave radar sensor comprising a second transmitter configured to emit a second electromagnetic signal towards the surface in a second direction different than the first direction, and a second receiver configured to receive a reflection of the second electromagnetic signal from the surface; and
a processor configured to determine a motion in a first motion direction with respect to the surface based on a Doppler-shift between the first electromagnetic signal and the reflection of the first electromagnetic signal, and a motion in a second motion direction with respect to the surface based on a Doppler-shift between the second electromagnetic signal and the reflection of the second electromagnetic signal, wherein the second motion direction is different than the first motion direction.

17. The pointing device of claim 16, wherein the pointing device is a computer mouse.

18. The pointing device of claim 16, wherein the processor is configured to:
extract distance information from the reflection of the first or second electromagnetic signal;
compare the extracted distance to a predefined distance; and
filter unwanted signals based on the comparison.

19. The pointing device of claim 16, wherein the first transmitter is configured to emit the first electromagnetic signal in an acute angle with respect to the surface and towards the surface, and wherein the second transmitter is configured to emit the second electromagnetic signal in an acute angle with respect to the surface and towards the surface.

20. The pointing device of claim 16, wherein:
the first transmitter comprises a first horn antenna; and
the second transmitter comprises a second horn antenna.

* * * * *